Jan. 10, 1967   N. O. KRENKE   3,297,367
FLUID CONVEYING SYSTEM
Filed July 21, 1965

INVENTOR.
Norman O. Krenke
BY
Learman, Learman & McCulloch
ATTORNEYS 3,297,367
FLUID CONVEYING SYSTEM
Norman O. Krenke, Saginaw, Mich., assignor to Baker Perkins Inc., Saginaw, Mich., a corporation of New York
Filed July 21, 1965, Ser. No. 473,714
8 Claims. (Cl. 302—42)

This application is a continuation-in-part of my application Serial No. 210,392, filed July 17, 1962, issued July 27, 1965, as Patent No. 3,197,257. The invention disclosed herein relates to certain novel and useful improvements in fluid conveying systems and more particularly to pneumatic conveying systems of the type wherein flour and similar products are conveyed by an air stream from one destination to another. In the copending application mentioned, mechanism is provided for measuring or indicating the quantity of material passing into the conduit, and more particularly indicating the amount of material fed to and through the conduit by a feeder mechanism operating in the lower portion of a flour supply bin. The timer or meter which was illustrated in the said prior application was operated at a constant speed when the pressure condition within the conduit near the feeder was within certain limits. Specifically, switch means sensitive to the back pressure in the conduit upstream of the point of delivery of the material to the stream was connected to an indicating timer circuit to make the timer circuit and cause the timer to operate when the back pressure was within certain high and low values which were chosen after experimentation with the system.

One of the prime objects of the present invention is to design a fluid conveying system of similar character which is different in concept in that it operates the measuring or indicating instrument at varying speeds, dependent on the flow or pressure in the conduit.

A further object of the invention is to provide a method of measuring the quantity of material delivered to a conduit from a source of supply to its destination which very accurately measures the flow of material in the system and thus provides an indication of the amount of material delivered to a mixer, for instance, even through the material may be supplied at varying rates or from a plurality of sources.

A further object of the invention is to provide a system of the character mentioned which is highly reliable in operation and is particularly suited to supplying flour to continuously operating dough processing equipment in automated bakeries at high speeds.

Figure 1:
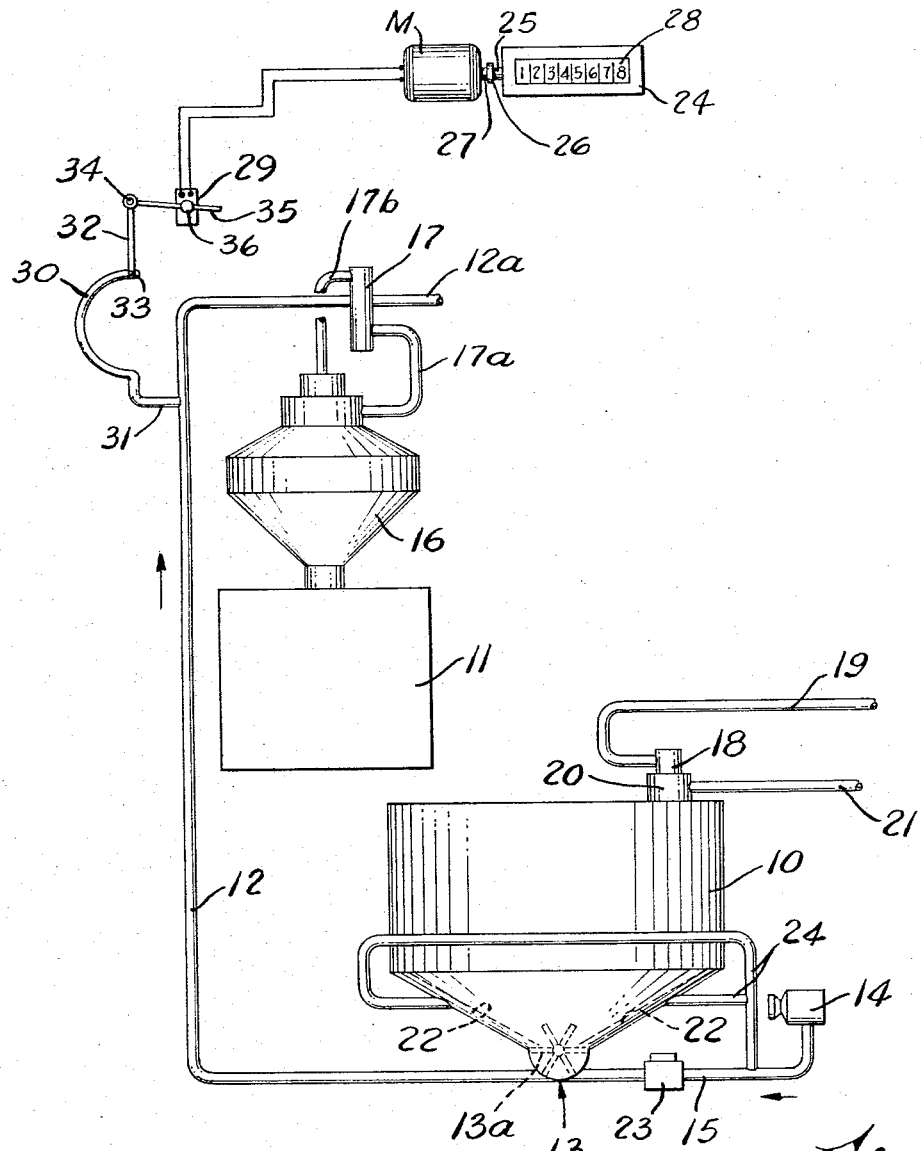
Figure 2:
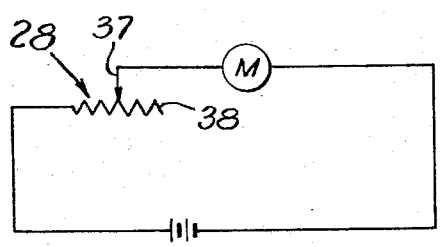

Other objects and advantages of the invention will be pointed out specifically or will become apparent from the following description when it is considered in conjunction with the appended claims and the accompanying drawings, in which:

FIGURE 1 is a schematic view illustrating a system in accordance with the invention; and FIGURE 2 is a schematic view illustrating typical electrical control circuitry for the system.

Referring now more particularly to the accompanying drawings in which a preferred embodiment of the invention only is shown, a numeral 10 in FIGURE 1 illustrates a bin or receptacle for storing flour which is to be conveyed to a dough mixer 11 through a conduit or line 12. Communicating with the bin 10 is a paddle wheel type feeder 13 including vanes 13a for feeding flour from the storage bin 10 into the air stream which is created by a suitable blower unit 14. Any suitable motor driven feeder, such as those mentioned in the aforementioned application, may be employed and the blower 14 may also be a conventional unit of the type previously mentioned, which is capable of delivering an air stream at a velocity in the neighborhood of 4000–5000 feet per minute through the conduit 15 connecting the blower 14 and feeder 13. The mixer 11 has a unit mounted on top thereof which includes a flour hopper 16 and a valve 17 of the type disclosed in my United States Patent No. 2,688,518, the valve 17 either delivering flour to the mixer 11 or bypassing the mixer 11 so that the flour can be delivered through line 12a to another mixer or the like. The line 17a is the charge conduit mentioned in my earlier patent, and the line 17d is the discharge conduit from the valve 17. Flour can be supplied to the storage bin 10 in any suitable manner, such as through the apparatus described in my presently pending parent application, which preferably includes a sifter supplying flour to the tube 18 through line 19. The tube 18, and a tube 20 comprising an outer tube, may comprise a separator unit of the type disclosed in United States Patent No. 3,030,153, which includes a line 21 returning to the blower (not shown) which supplies flour through the line 19.

While I have described a positive air system, it is to be understood that vacuum fans or the like may be employed to move the air and flour through the conduits mentioned, and it is to be understood that the systems may be open or closed in the sense of their circulation of air or another conveying medium. Thus far, a conventional pneumatic system has been described, and preferably bin 10 will be of the type having an air slide plenum chamber 22 of the character described in the copending application to which I have referred. The air pressure in the plenum chamber 22, which enhances the flow of flour to the feeder 13, is preferably under the control of a valve 23 of the type mentioned in the said copending application, and it will be observed that a line 24 leads from line 15 upstream of the valve 23 to opposite sides of the plenum chamber 22.

It is highly desirable in automated bakery operations to know with some accuracy the quantity of flour delivered through the line 12 to the mixer 11. To this end, a conventional mechanical counter or timer T has its input shaft 25 mechanically coupled, as at 26, to the armature shaft 27 of a variable speed direct current electric motor M. The counter 24 is preferably of the type having a multiplicity of side-by-side indica wheels 28 with numerals running from zero to 9 printed around their peripheries. While it is not shown in the drawings, a gear reducing unit is preferably employed between the motor M and the counter device 24. Connected to operate the shunt motor M at varying speeds is a rheostat device 29 which imposes a varying resistance in series with the armature of the motor in the usual manner. The position of the rheostat 29, and accordingly the amount of resistance in the motor circuit, is controlled by a Bourdon tube 30 which connects via a line 31 to the conduit 12 and is sensitive to the pressure therein. A link 32 connected as at 33 to the free end of the Bourdon tube 30 pivotally connects as at 34 to a lever 35 which is mounted on a pivot shaft 36. The pivot shaft 36 is the control shaft of the conventional potentiometer rheostat which variably positions the movable lead 37 relative to the resistance 38.

In operation, as flour is fed into the line 12 by the feeder 13 the quantity thereof entrained in the air stream and flowing past the pipe 31 is continuously measured and indicated by the system described, since the pressure in line 31 and in the Bourdon tube 30 is directly dependent on the quantity of flour entrained in the air stream. For example, if the quantity of material flowing through the line 12 is increased or decreased, the pressure in line 12, and accordingly in the tube 30, will be increased or decreased, respectively, accordingly and the speed of the motor M will be increased or decreased accordingly to accurately indicate the quantity of material flowing through line 12. The rheostat 29 is set so that if no flour is being conveyed through line 12 the greatest resistance is being imposed in the motor circuit and the armature shaft 27 is not driven. Other than this, the expansion of the tube 30 and the resistance thereby imposed is such that the counter 24 accurately records the maximum possible flow of material through the conduit 12.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. In a fluid conveying system; conduit means; fluid stream introducing means communicating therewith; supply means for particulate material to be entrained in and conveyed by said fluid stream; means for delivering said material from the supply means to the conduit means; quantity measuring means; motor means for driving said measuring means; and motor control means communicating between said motor means and said conduit means for operating said motor means at varying speeds in accordance with the flow of material through said conduit means to indicate the quantity of material delivered through said conduit means.

2. In a fluid conveying system; conduit means; fluid stream introducing means communicating therewith; means for delivering particulate material to be conveyed by said fluid stream to the conduit means; indicating means operable at various speeds; and means communicating between said conduit means and said indicating means for operating the latter at varying speeds proportional to the flow of material through said conduit means to indicate the quantity of material delivered through said conduit means.

3. In a fluid conveying system; conduit means; fluid stream introducing means communicating therewith; means for delivering particulate material to be entrained in and conveyed by said fluid stream to the conduit means; indicating means operable at varying speeds; means for regulating the speed of operation of said indicating means; and means communicating between said conduit means and said regulating means for operating said indicating means at speeds proportional to the flow of material through said conduit means to cause said indicating means to indicate the quantity of material delivered through said conduit means.

4. The combination defined in claim 3 in which said regulating means comprises electric motor means connected in an electrical circuit.

5. The combination defined in claim 4 in which said regulating means comprises pressure sensitive means and a variable resistance connected in said circuit for varying the speed of said motor means according to the pressure in said conduit means.

6. In a fluid conveying system; conduit means; fluid stream introducing means communicating therewith; supply means for particulate material to be entrained in and conveyed by said fluid stream; means for delivering said material from the supply means to the conduit means; indicating means; and pressure sensitive means communicating between said conduit means and said indicating means, held in various intermediate positions between its end positions in accordance with the pressure in said conduit means, for operating said indicating means to indicate the quantity of material delivered through said conduit means when said pressure sensitive means is in said intermediate positions.

7. In a fluid conveying system; conduit means; means in communication with said conduit means for introducing a fluid stream thereto; supply means for particulate material; means in communication with said supply means and with said conduit for introducing thereto particulate material from said supply means; indicator means for indicating the quantity of material entrained and conveyed by said fluid stream; and pressure sensitive operating means, in communication with and actuated by the pressure of the fluid in said conduit means proportionately to changes in pressure therein caused by varying quantities of particulate material entrained in said fluid stream, connected with said indicator means for operating the latter to reflect the varying pressures in said conduit means.

8. The combination defined in claim 7 in which said pressure sensitive operating means includes an expandable and contractable member.

References Cited by the Examiner

UNITED STATES PATENTS

| 2,288,099 | 6/1942 | Mason. | |
|---|---|---|---|
| 2,726,076 | 12/1955 | Du Heaume | 302—3 X |
| 2,956,251 | 10/1960 | Goeppinger et al. | 73—398 X |
| 2,976,506 | 3/1961 | Bourns | 73—398 X |
| 3,001,829 | 9/1961 | Saint-Martin | 302—53 |
| 3,197,257 | 7/1965 | Krenke | 302—3 |

FOREIGN PATENTS

| 222,165 | 3/1907 | Germany. |
|---|---|---|
| 253,684 | 12/1910 | Germany. |

ANDRES H. NIELSEN, *Primary Examiner.*

HUGO O. SCHULZ, *Examiner.*

A. L. LEVINE, *Assistant Examiner.*